US010371943B2

(12) United States Patent
Ellsworth

(10) Patent No.: US 10,371,943 B2
(45) Date of Patent: Aug. 6, 2019

(54) METHOD AND SYSTEM TO CONTROL THE FOCUS DEPTH OF PROJECTED IMAGES

(71) Applicant: VALVE CORPORATION, Bellevue, WA (US)

(72) Inventor: Jeri Janet Ellsworth, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 308 days.

(21) Appl. No.: 13/831,080

(22) Filed: Mar. 14, 2013

(65) Prior Publication Data

US 2014/0267941 A1 Sep. 18, 2014

(51) Int. Cl.
G02B 27/01 (2006.01)

(52) U.S. Cl.
CPC ....... *G02B 27/0172* (2013.01); *G02B 27/017* (2013.01); *G02B 2027/0127* (2013.01); *G02B 2027/0147* (2013.01)

(58) Field of Classification Search
USPC .................. 349/11, 15; 359/630; 345/4, 7, 9
See application file for complete search history.

(56) References Cited

U.S. PATENT DOCUMENTS

| | | | | |
|---|---|---|---|---|
| 7,948,580 B2 * | 5/2011 | Sakai | ................... | G02F 1/1323 349/117 |
| 2001/0013959 A1 | 8/2001 | Long et al. | | |
| 2003/0112507 A1 | 6/2003 | Divelbiss et al. | | |
| 2006/0232665 A1 | 10/2006 | Schowengerdt et al. | | |
| 2007/0053060 A1 * | 3/2007 | Jung | ................... | H04N 13/0454 359/463 |
| 2009/0116732 A1 | 5/2009 | Zhou et al. | | |
| 2011/0075071 A1 * | 3/2011 | Toussaint | ............. | G02B 6/0016 349/65 |
| 2011/0292319 A1 * | 12/2011 | Cole | ................. | G02F 1/133555 349/62 |
| 2012/0050138 A1 * | 3/2012 | Sato | ....................... | B60K 35/00 345/4 |
| 2012/0075534 A1 | 3/2012 | Katz et al. | | |

OTHER PUBLICATIONS

PCT International Search Report dated Sep. 12, 2014 of International Application No. PCT/US14/22181. 11 Pages.

* cited by examiner

*Primary Examiner* — Edward J Glick
*Assistant Examiner* — David Y Chung
(74) *Attorney, Agent, or Firm* — Seed IP Law Group LLP

(57) ABSTRACT

Methods and systems are disclosed for controlling the focus depth of a 2D projected image on a pixel by pixel basis or on a region by region basis to create a 3D projected image that may be used for a heads up display (HUD) for augmented reality applications. The 3D projected image may be overlaid or combined with a 3D real world view using multiple reflective LCD arrays. The multiple reflective LCD arrays may receive a 2D projected image and may generate different length optical paths that may add depth to the 2D projected image to create a 3D projected image. The 3D projected image may be combined with the real world 3D image to create a 3D image encompassing a real world image and a 3D projection image that looks real and contains depth within the image.

18 Claims, 17 Drawing Sheets

METHOD AND SYSTEM TO CONTROL THE FOCUS DEPTH OF PROJECTED IMAGES

BACKGROUND OF THE DISCLOSURE

1. Field of the Disclosure

The disclosure relates generally to methods and systems to control and vary the focus depth of a two-dimensional (2D) projected image on a pixel by pixel basis or on a region by region basis to generate a three-dimensional 3D projected image and, in certain embodiments, to methods and systems for providing a combined viewing image that may be an overlay or a combination with a 3D real world view and an image generated using multiple reflective LCD arrays to generate a 3D image from a 2D projected image for use in a heads-up display (HUD) for augmented reality applications.

2. General Background

A projected image overlaid onto the eye along with a real world image simultaneously to generate a combined image may have a different dimension associated with each of the input images for use with a heads-up display (HUD) for augmented reality applications. These different dimensions from each of the input images may create a 2D projected image view along with a 3D image view of the real world that may not appear as a homogeneous 3D image.

There is a need in the art to compensate for viewing offset issues when using a heads-up display (HUD) for augmented reality applications so that the eye may be presented a combined image that correctly represents the images when combined. Depth may need to be part of the image to correctly represent the images when combined. One solution may be to convert the 2D projected image to a 3D image before overlaying the 2D projected image onto the 3D real world image by using a 2D to 3D image converter so that the image combiner combines two 3D images therefore combining 2 images that contain depth information within each of the images. Accordingly, it is desirable to address the limitations in the art. For example, there exists a need to provide for systems and methods that may improve the combination of 2D projected images with 3D real world images to present to the eye simultaneously for heads up display (HUD) application.

BRIEF DESCRIPTION OF THE DRAWINGS

By way of example, reference will now be made to the accompanying drawings, which are not to scale.

DETAILED DESCRIPTION

Figure 1:
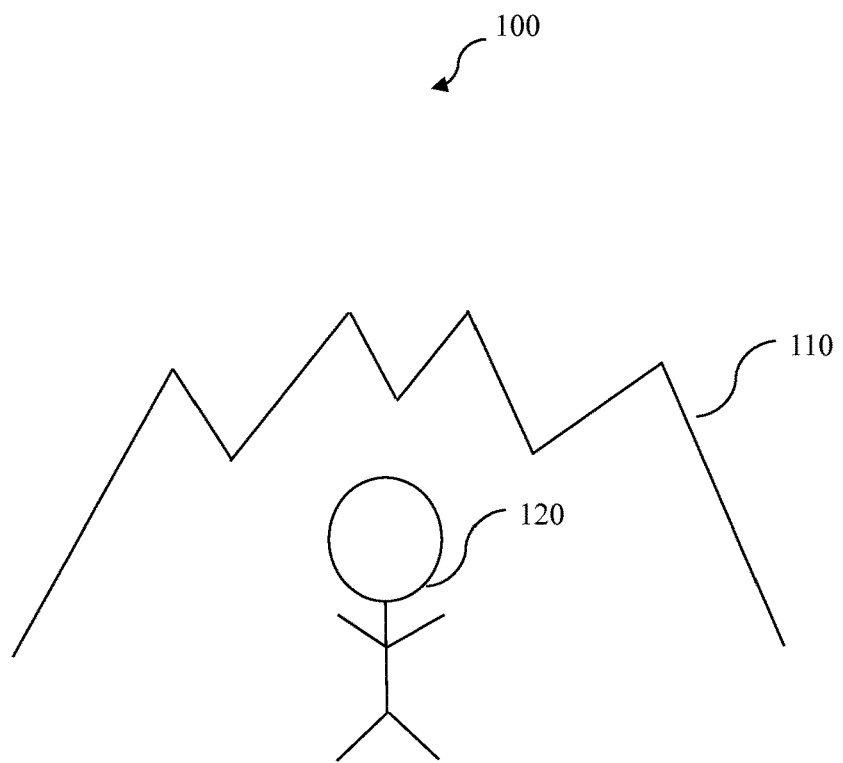
FIG. 1 depicts a combined image of a 2D projected image with a 3D real world image as viewed by an eye within a heads-up display (HUD) for augmented reality applications.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

In certain embodiments, an image combiner system is disclosed, comprising: a 2D image projector; a 2D to 3D image converter for converting a 2D projected image from the 2D image projector to a 3D projected image; and an image combiner for combining the 3D projected image with a 3D real world image. The image combiner system may further comprise a plurality of 2D to 3D image converters. The 3D projected image may comprise at least two focal lengths. The 2D to 3D image converter may comprise at least one LCD pixel array and a reflective screen. The 2D to 3D image converter may comprise: a first LCD pixel array with a first focal length; a second LCD pixel array with a second focal length; and a reflective screen. The at least one LCD pixel array may comprise at least one LCD pixel shutter. The at least one LCD pixel array may comprise M rows and N columns of LCD pixel shutters. The at least one LCD pixel array may be programmable to reflect at least one pixel from the 2D projected image away from one of the at least one LCD pixel array. The at least one LCD pixel array may be programmable to reflect at least one group of pixels from the 2D projected image away from one of the at least one LCD pixel array. The at least one LCD pixel shutter may be programmable to permit at least one pixel from the 2D projected image to pass transparently through the reflective LCD pixel array. The at least one LCD pixel shutter may be programmable to permit at least one group of pixels from the 2D projected image to pass transparently through the reflective LCD pixel array.

In certain embodiments, a method of combining images is disclosed, comprising: projecting a 2D image; converting the 2D image to a 3D projected image; and combining the 3D projected image with a 3D real world image. The step of converting may comprise: applying a first focal length to a first one or more pixels of the 2D image; and applying a second focal length to a second one or more pixels of the 2D image. The step of converting may be performed at least in part by at least one LCD pixel array and a reflective screen. The step of converting may be performed at least in part by: a first LCD pixel array with a first focal length; a second LCD pixel array with a second focal length; and a reflective screen. The step of converting may comprise: reflecting a first one or more pixels of the 2D image at a first LCD pixel array to apply a first focal length to the first one or more pixels; and reflecting a second one or more pixels of the 2D image at a second LCD pixel array to apply a second focal length to the second one or more pixels. The step of converting may further comprise reflecting a third one or more pixels of the 2D image at a reflective screen to apply a third focal length to the third one or more pixels. The at least one LCD pixel array may comprise M rows and N columns of LCD pixel shutters. The step of converting may comprise programming at least one LCD pixel shutter to reflect at least one pixel from the 2D image away from the reflective LCD pixel array. The step of converting may comprise programming at least one LCD pixel shutter to reflect at least one group of pixels from the 2D image away from the reflective LCD pixel array. The step of converting may comprise programming at least one LCD pixel shutter to permit at least one pixel from the 2D image to pass transparently through the reflective LCD pixel array.

In certain embodiments, methods and systems are disclosed for controlling the focus depth of a projected image on a pixel by pixel basis or on a region by region basis to create a projected 3D image that may be used for a heads up display (HUD) for augmented reality applications. The projected 3D image may be overlaid or combined with a 3D real world view using multiple reflective LCD arrays. The multiple reflective LCD arrays may receive a 2D projected image and may generate different length optical paths that may add depth to the 2D projected image to create a 3D projected image. The 3D projected image may then be combined with the real world 3D image to create a combined 3D image encompassing a real world image and a converted 2D to 3D projection image that contains depth within the image. Other aspects and advantages of various aspects of the present invention can be seen upon review of the figures and of the detailed description that follows.

A 2D projected image overlaid with a 3D image view of the real world may appear as in FIG. 1. FIG. 1 depicts a person 120 that may be projected as standing in front of a real world 3D image, such as mountains 110. The combined image may appear as a person standing next to the mountain 110 instead of standing further in front of the mountains as may be how the scene actually should appear. FIG. 1 depicts a 2D projected image overlaid or combined with a 3D image view of the real world. Without the use of 3D conversion techniques on the 2D projected image, the images when blended may not appear correctly and may create viewing offset issues, such as image depth issues when using a heads-up display (HUD) for augmented reality applications. The viewing offset issues may be improved by converting the 2D projected image to a 3D image before combining it with a 3D image view of the real world. Converting the 2D projected image to a 3D image before combining the converted image with a 3D image may allow the combination of the images to be correctly displayed without any offset issues by the addition of depth to the original 2D projected image before it is combined with the another 3D image.

Figure 2:
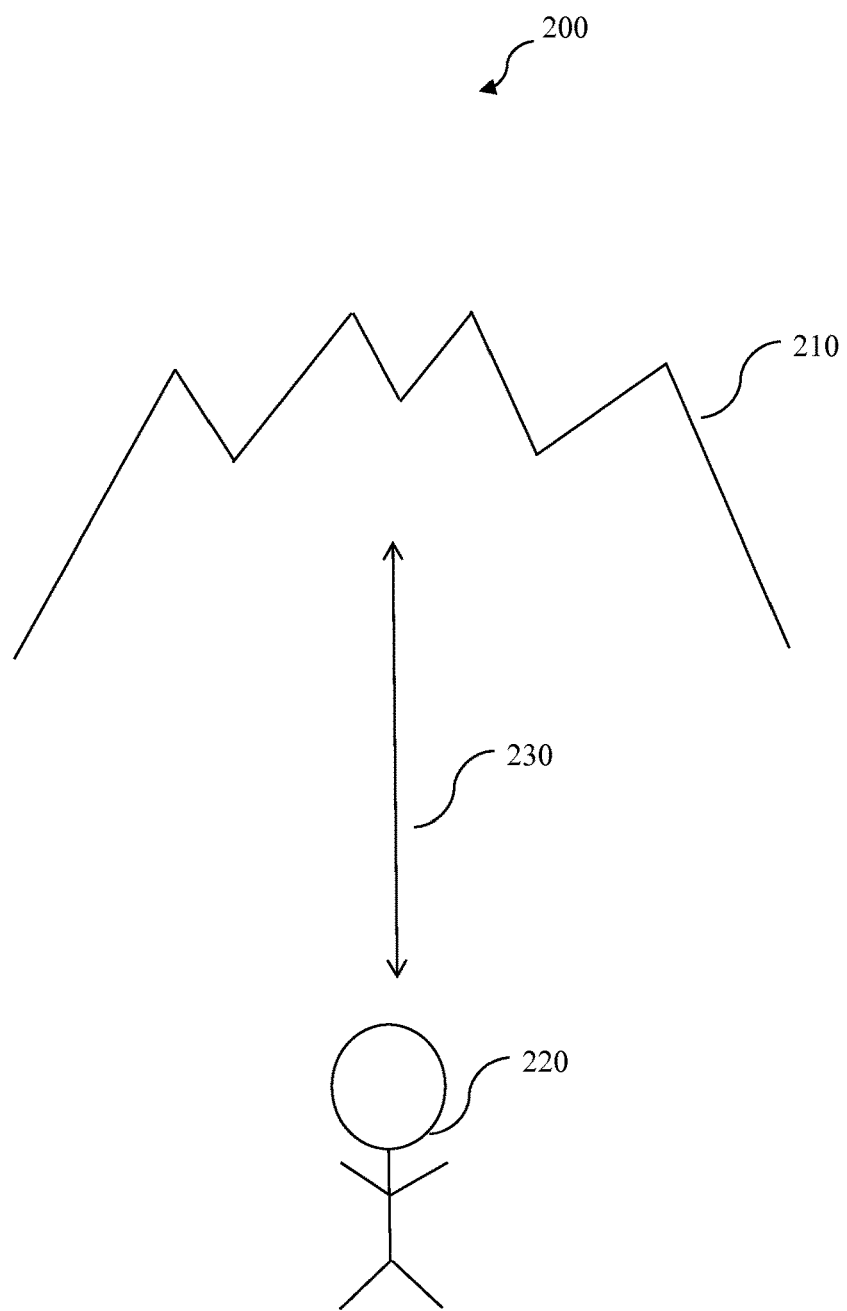
FIG. 2 depicts a combined image of a 2D projected image that has been converted to a 3D projected image with a 3D real world image as viewed by an eye within a heads-up display (HUD) for augmented reality applications in accordance with certain embodiments.

In certain embodiments, FIG. 2 shows what the image may look like if the projection of the 2D image is first converted to a 3D image and then overlaid or combined with a 3D object. The person 220 may appear to be standing in front of the mountains 210 at some distance 230 away from the mountains in the combined image of FIG. 2 whereas in the combination of a 2D image with a 3D image as in FIG. 1, the person 120 may appear to be standing next to the mountain 110. The combination of two 3D images may allow for the image to create depth within the image and allow for the image to look more realistic to the viewer, or in other words 3D.

Figure 3:
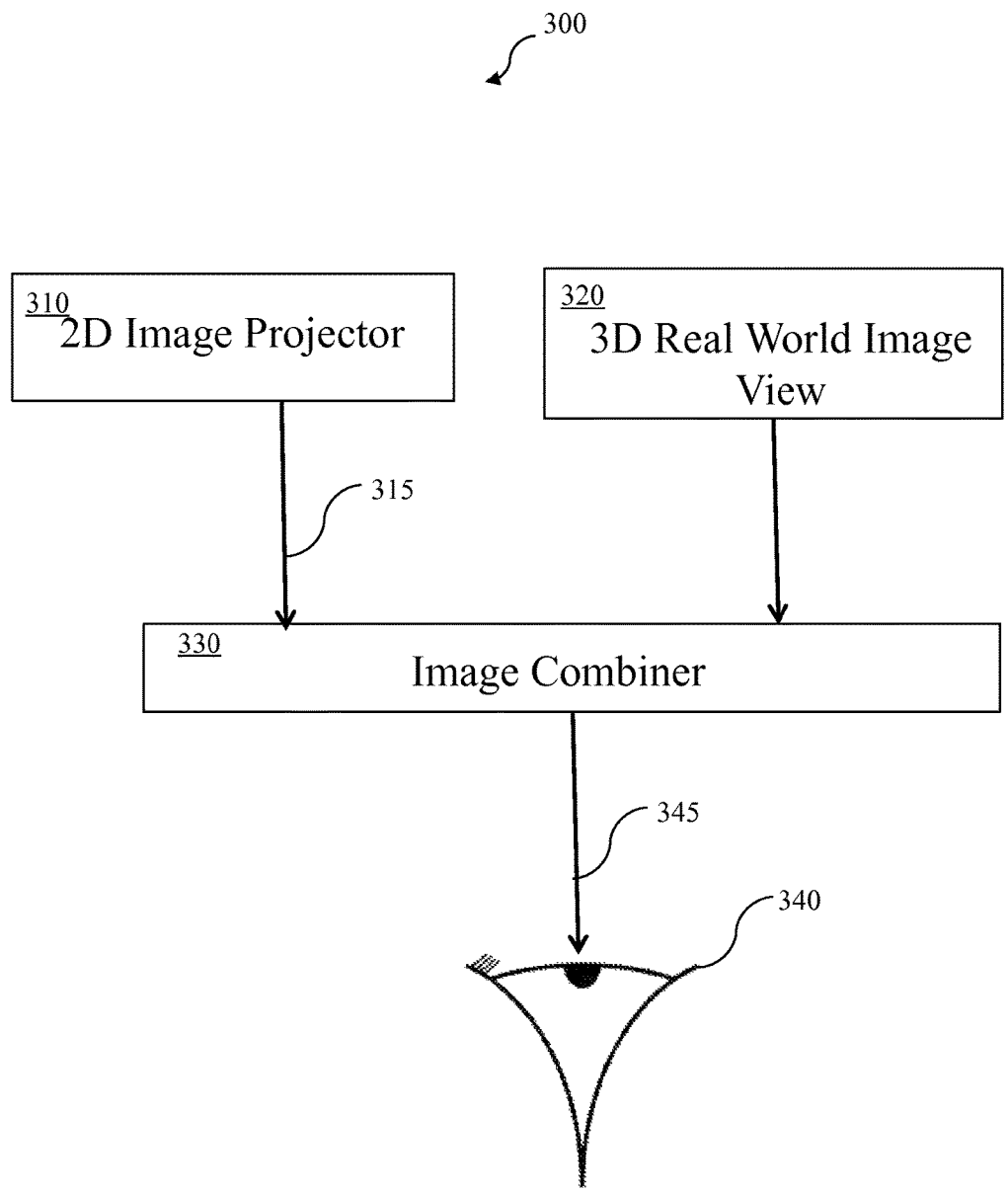
FIG. 3 depicts a 2D projected image and a 3D real world image view that may be combined and presented to the eye within a heads-up display (HUD) for augmented reality applications in accordance with certain embodiments.

In certain embodiments, FIG. 3 shows that an output of a 2D image projector 310 and the 3D real world image view 320 may be combined using an image combiner 330. The output result 345 of the image combiner 330 may be a combination of a 2D projection image view output 315 with a 3D image view output 320 for the eye 340, which may create viewing offset issues when using a heads-up display (HUD) for augmented reality applications. Combining 2D images with 3D images may cause offset issues in the form of visual depth discrepancies as shown in FIG. 1.

Figure 4:
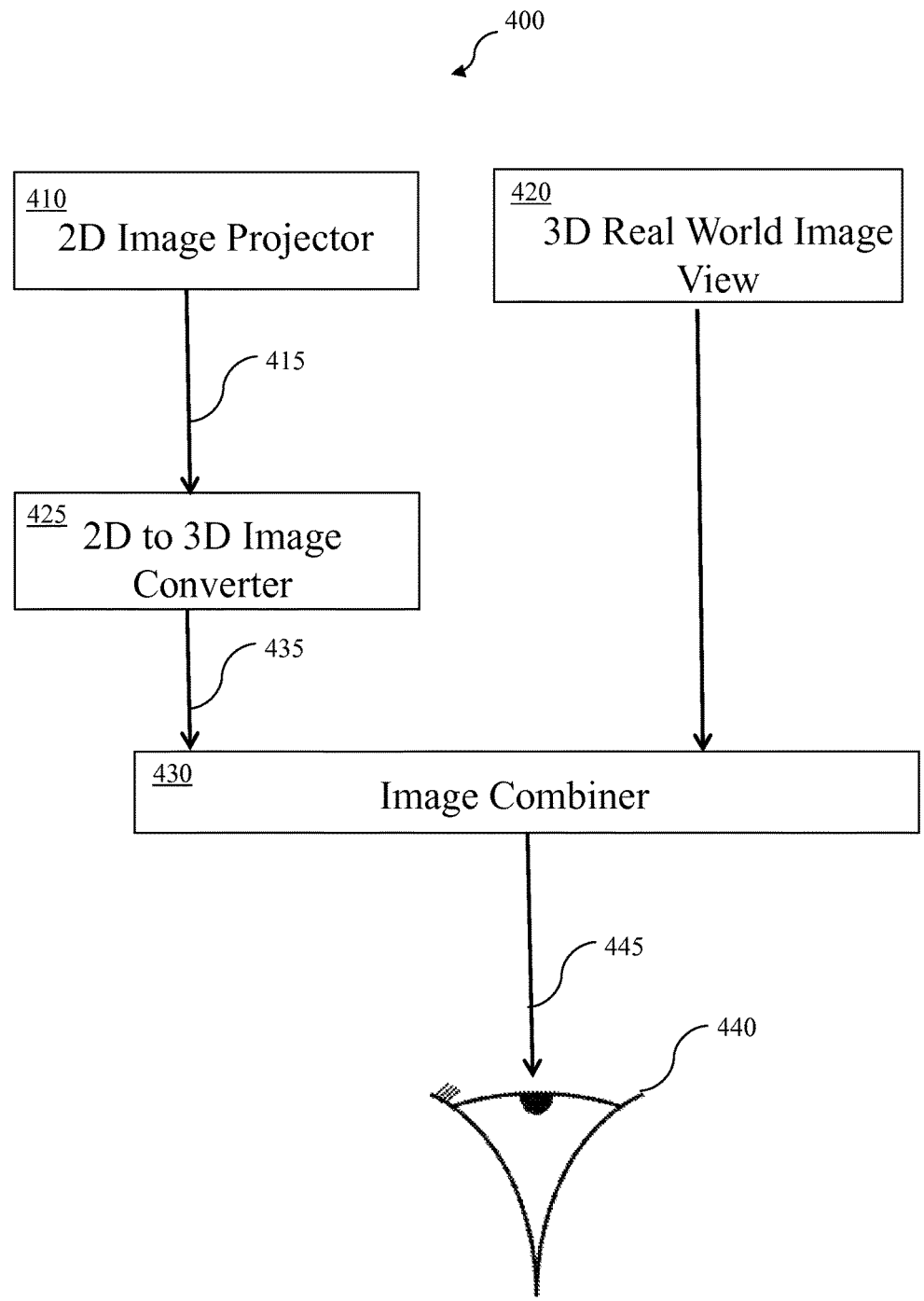
FIG. 4 depicts a 2D projected image converted to a 3D projected image combined with a 3D real world image view and presented to the eye within a heads-up display (HUD) for augmented reality applications in accordance with certain embodiments.

In certain embodiments, FIG. 4 depicts a 2D image projector 410 that may project a 2D image 415 to a 2D to 3D image converter 425. The 2D to 3D image converter 425 may receive a 2D projected image 415 as an input and output a 3D projected image 435. The 3D projected image 435 and the 3D real world image view 420 may be combined using an image combiner 430. The result of the image combiner 430 may be a combined a combined 3D image 445 that may be presented to an eye 440. Optionally, the combined 3D image 445 may be presented to eye 440 using a heads-up display (HUD) for augmented reality applications.

In certain embodiments, the 2D to 3D image converter 425 may convert individual image pixels from 2D to 3D or regions of image pixels from 2D to 3D. 2D to 3D image converter 425 may generate a 3D image from a 2D projected image by modifying the length of the optical path from the image projector to the eye.

Figure 5:
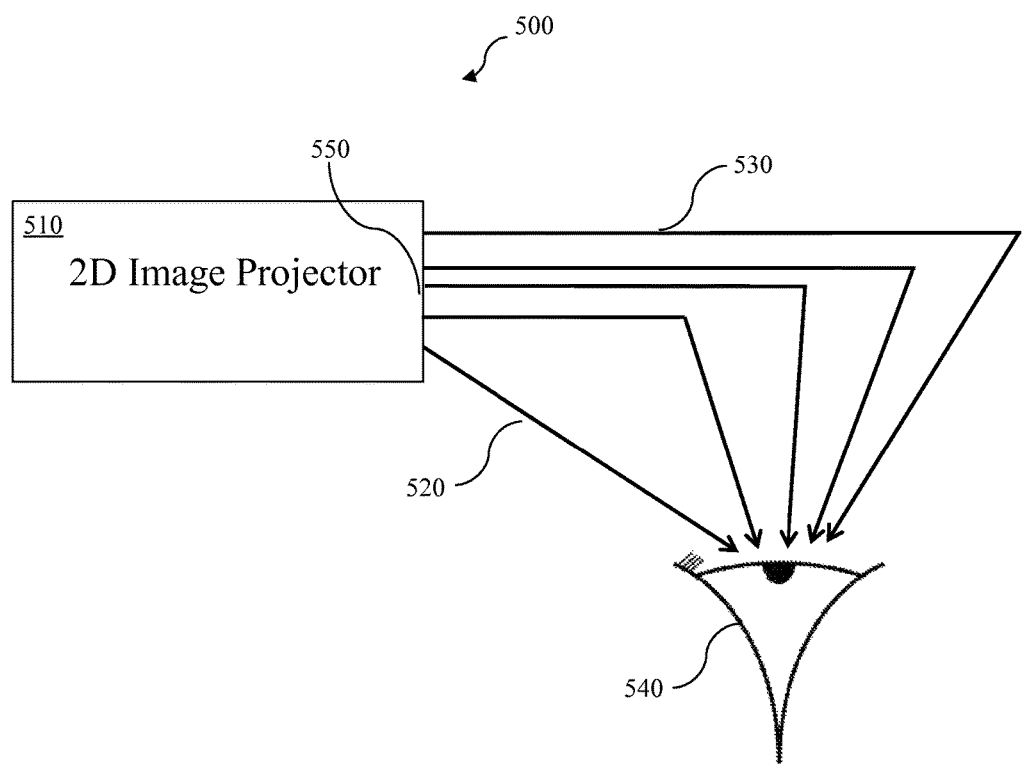
FIG. 5 depicts a 2D to 3D image converter with different optical length paths of the 2D image projection and presented to the eye within a heads-up display (HUD) for augmented reality applications in accordance with certain embodiments.

In certain embodiments, FIG. 5 depicts the modification of the length of the optical paths 550. Optical path 530 may be the longest path between the 2D image projector 510 and the eye 540 whereas the optical path 520 may be the shortest path between the 2D image projector 510 and the eye 540. A system 500 may have any number of different optical length paths 550. The optical length paths 550 may travel different lengths to generate different depths of individual image pixels or regions of image pixels where a region may be a grouping of image pixels. A region may be defined as any grouping of two or more individual image pixels within the image. The longer the optical path 550, the further away an image may be displayed. To generate a 3D image as shown in FIG. 2, the region of image pixels displaying the person 220 may take the shortest optical path 520 between the 2D image projector 510 and the eye 540 since the image of the person 220 may be closest to the viewer. Whereas the optical path 550 for the region of image pixels displaying the mountain 210 may take the longest optical path 530 between the 2D image projector 510 and the eye 540 since the image of the mountain 210 may be the furthest from the viewer.

Figure 6:
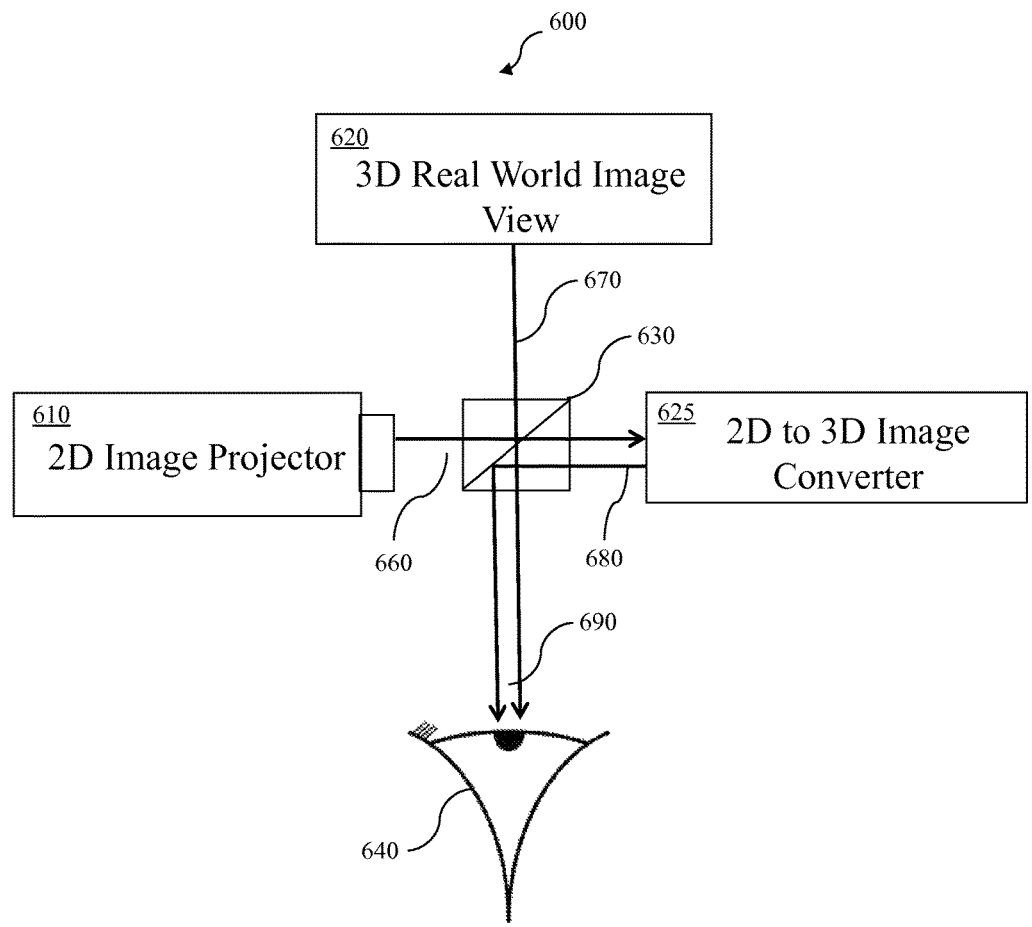
FIG. 6 depicts a 2D projected image converted to a 3D projected image combined with a 3D real world image view and presented to the eye within a heads-up display (HUD) for augmented reality applications in accordance with certain embodiments.

In certain embodiments, FIG. 6 depicts an image combiner 630 between the eye 640 and the 3D real world image view 620. The 2D projected image output 660 from the 2D image projector 610 may be received by the 2D to 3D image converter 625, where the 2D projected image may be converted to a 3D projected image and output from the 2D to 3D image converter 625. The 3D projected output image 680 may be transferred to the image combiner 630 and combined with the 3D real world image view output 670 and a combined 3D image 690 may be delivered to the eye 640.

Figure 7:
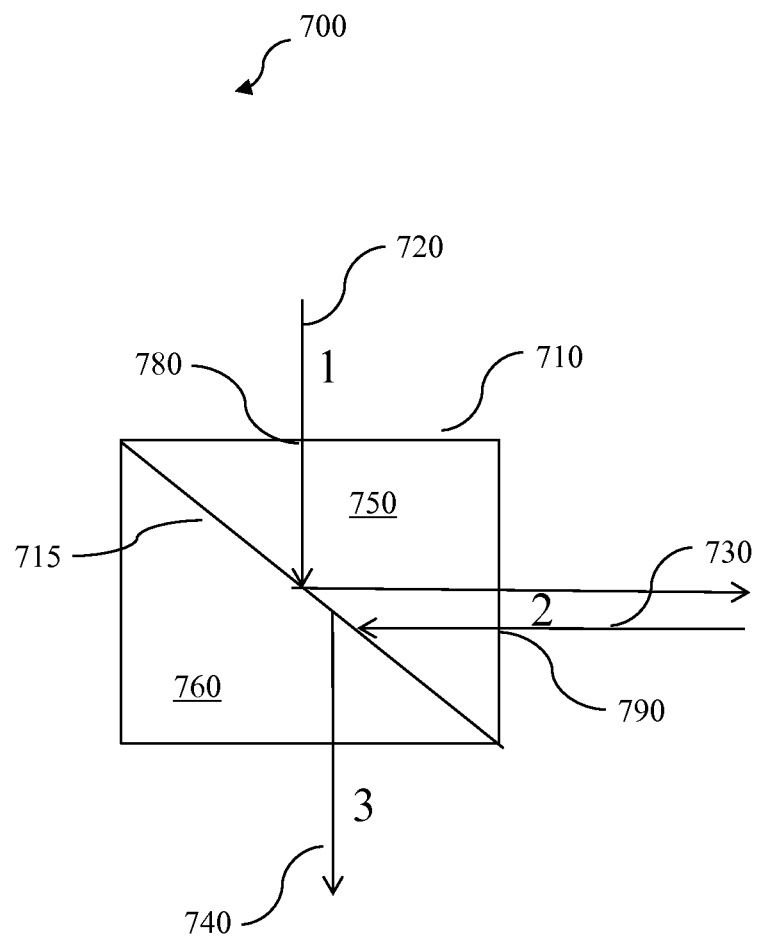
FIG. 7 depicts an image combiner that combines multiple images together within the heads-up display (HUD) for augmented reality applications in accordance with certain embodiments.

In certain embodiments, FIG. 7 depicts an image combiner 710. The image combiner 710 may be an optical device that combines image 1 720 with image 2 730 into combined image 3 740. The image combiner 710 is not limited to combining only 2 images. Any number of images may be combined to produce a combined image 3 740. Therefore, it is understood that the invention is not to be limited to the specific embodiments disclosed, and that modifications and embodiments are intended to be included as readily appreciated by those skilled in the art.

In certain embodiments, the image combiner may be a rectangle made from two triangular glass prisms 750 and 760 which may be glued together at their base 715 using polyester, epoxy, or urethane-based adhesives. The thickness of the resin layer may be adjusted such that, for a certain wavelength, a portion of the light incident 720 through port 1 780 such as the face of the cube may be combined with a portion of the light incident 730 through port 2 790 such as the face of the cube. The portion of light that is combined from source port 1 780 and from source port 2 790 may be transmitted to output port 3 740.

Figure 8:
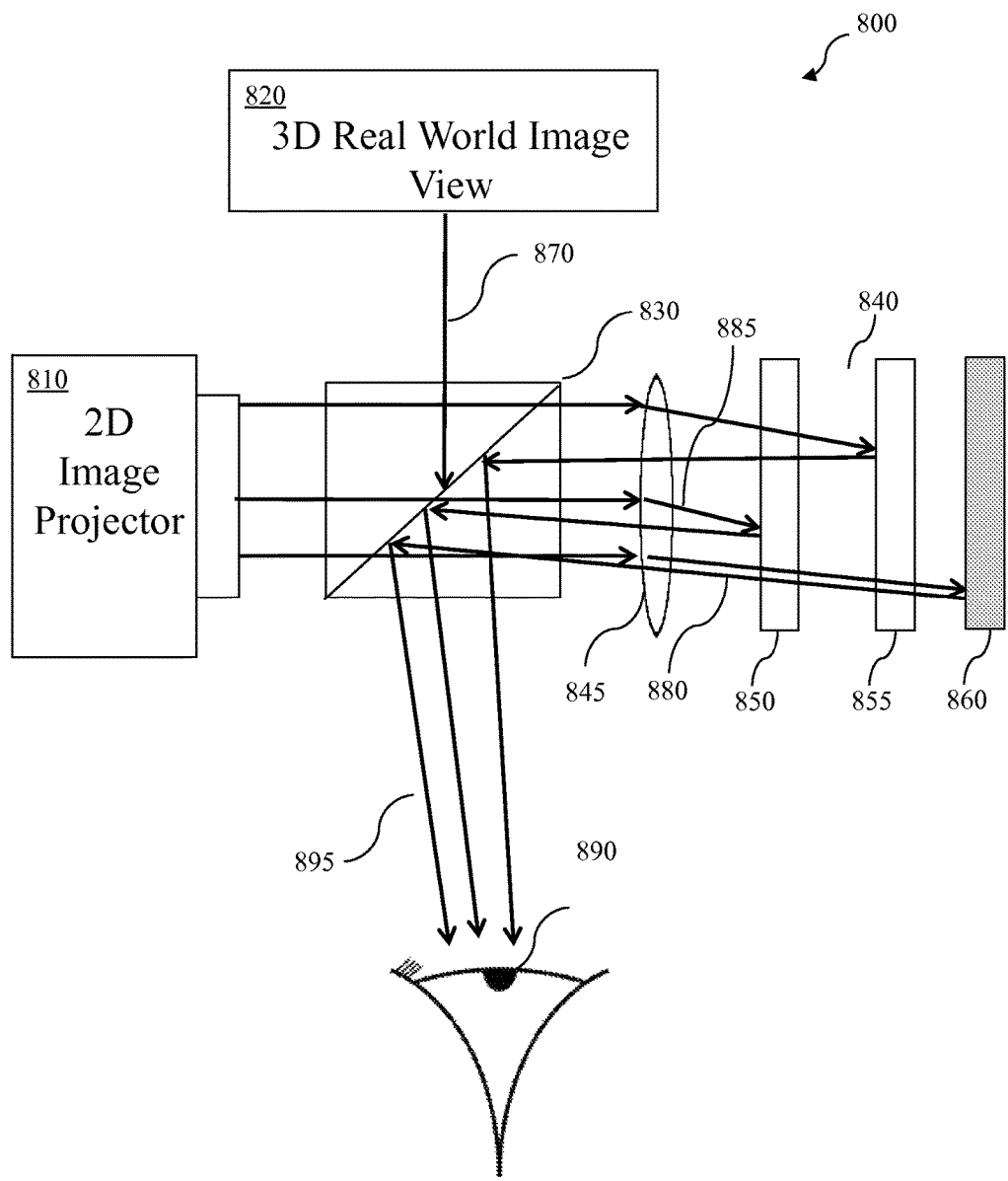
FIG. 8 depicts a 2D projected image converted to a 3D projected image combined with a 3D real world image view and presented to the eye within a heads-up display (HUD) for augmented reality applications in accordance with certain embodiments.

In certain embodiments, FIG. 8 depicts an image combiner 830 with a 2D to 3D image converter 840 for converting a 2D projected image from the 2D image projector 810 to a 3D image. The image combiner 830 combines the 3D real world image view 820 with the 2D image projector 810 image output after the 2D image projector image is converted from 2D to 3D and transfers the combined 3D image 895 to the eye 890. The 2D to 3D image converter may comprise a focus optics element 845 and multiple reflective LCD arrays 850 and 855 and a reflective screen 860. Each reflective LCD array 850 and 855 may selectively reflect an individual pixel or a region (grouping) of image pixels or may be transparent to an individual pixel or a region (grouping) of image pixels. By closing the reflective LCD pixel shutters of the reflective LCD array 850 and 855 the projection for the individual pixel or the region of image pixels may be reflected back towards the image combiner 830. By opening the reflective pixel shutters of the reflective LCD arrays 850 and 855, the projection for the individual pixel or the region of image pixels may pass through the LCD array transparently towards the next reflective LCD in the chain of stacked reflective LCDs or the reflective screen 860 which may be the last reflective element in the chain. The opening and closing of the reflective pixel shutters of the LCD arrays 850 and 855 may selectively vary the length of the optical path that a pixel or region of image pixels may travel. By varying the optical path of different portions of the 2D projected image from the 2D image projector 810 by different amounts, the 2D image may be converted to a 3D image by the generation of a plurality of different optical focal lengths within the image. The focal lengths of the image may be varied to improve the depth of the picture and create a 3D image from a 2D image. The reflective screen 860 may be the last reflective element in the chain of n optical reflective LCDs, where n may be any number greater than one. Any optical path that may be reflected by the reflective screen 860 may be the longest optical path 880 from the 2D image projector through the 2D to 3D image converter. The longest optical path 880 represents the pixels within the image that may be the furthest from the viewer. Any optical path that may be reflected by the first reflective LCD 850 in the chain of optical reflective LCDs may be the shortest optical path 885 and represents the pixels within the image that may be the closest to the viewer. FIG. 8 depicts two stacked LCD arrays 850 and 855. One of ordinary skill in the art will recognize that there may be any number greater than one of stacked reflective LCD arrays within the 2D to 3D image converter. The more stacked reflective LCDs within the 2D to 3D image converter may allow for more focal points which may allow for more addition of depth content to the converted 2D image to 3D image. Therefore it is understood that the invention is not to be limited to the specific embodiments disclosed, and that modifications and embodiments are intended to be included as readily appreciated by those skilled in the art.

Figure 9:
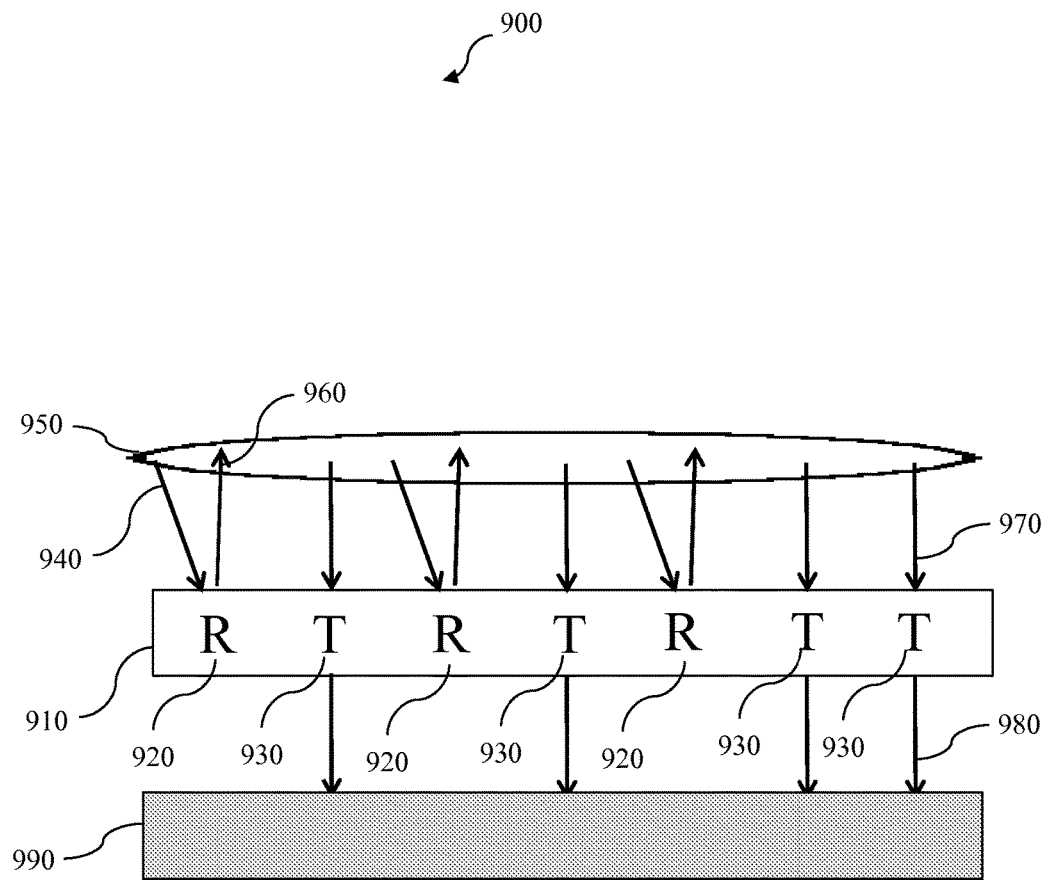
FIG. 9 depicts a side view of a row of reflective LCD pixel shutters within a reflective LCD array programmed to be either reflective or transparent in accordance with certain embodiments.

In certain embodiments, FIG. 9 depicts a side view of a row of reflective LCD pixel shutters 910 of a reflective LCD array within a 2D to 3D image converter. Each reflective LCD pixel shutter within the row may be programmed to be either closed which may be reflective (R) 920 or open which may be transparent (T) 930. A pixel projected image 940 that may be projected to a closed reflective LCD pixel shutter 920 may reflect the image 960 back towards the focus optics 950 for combination within the image combiner 830. A pixel projected image 970 that may be projected to an open reflective LCD pixel shutter 930 may allow the image 970 to transparently transfer the pixel image through the reflective LCD array 910 towards the next reflective element 990. The reflective LCD pixel shutters may be programmed to be either closed, reflective (R), or open, transparent (T), in any combination so that different focal lengths may be created to generate depth within the converted image. The depth addition that may be required may be dependent on the image that may be projected.

Figure 10:
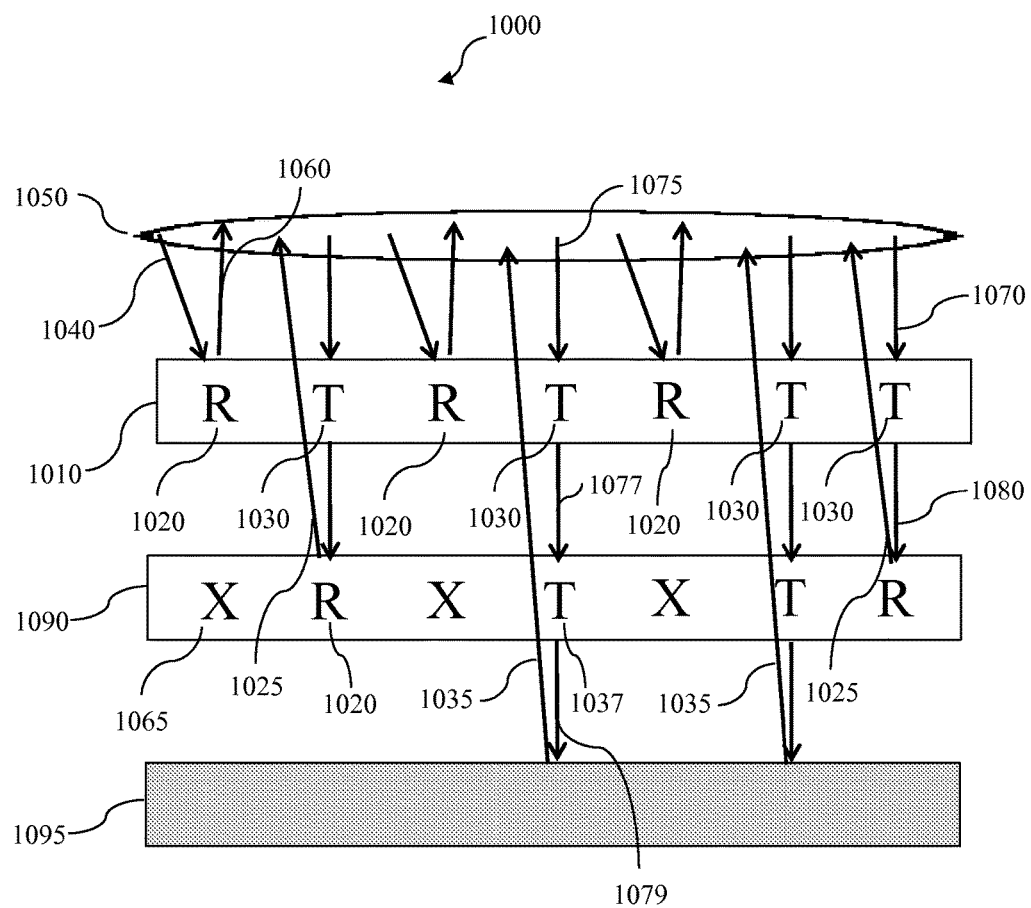
FIG. 10 depicts a side view of a row of reflective LCD pixel shutters within multiple reflective LCD arrays programmed to be either reflective or transparent and a reflective screen in accordance with certain embodiments.

In certain embodiments, FIG. 10 depicts a side view of a row of reflective LCD pixel shutters of multiple reflective LCD arrays 1010 and 1090 within a 2D to 3D image converter. Each reflective LCD pixel shutter within a row of reflective LCD arrays 1010 and 1090 may be programmed to be either closed which may be reflective (R) 1020 or open which may be transparent (T) 1030. A pixel projected image 1040 that may be projected to a closed reflective LCD pixel shutter 1020 on a first reflective LCD array 1010 may reflect the image 1060 back towards the focus optics 1050 for combination within the image combiner 830. A pixel projected image 1070 that may be projected to an open reflective LCD pixel shutter 1030 on a first reflective LCD array 1010 may allow the pixel image 1070 to transparently transfer the pixel image through the first reflective LCD array 1010 and transmit the pixel image 1080 towards the second reflective LCD array 1090. The pixel projected image 1080 that may be projected to a closed reflective LCD pixel shutter 1020 on a second reflective LCD array 1090 may reflect the image 1025 back towards the focus optics 1050 for combination within the image combiner 830.

The second reflective LCD array 1090 containing the reflective LCD pixel shutter 1065 may not reflect or transparently transfer a pixel image to the next reflective element, such as a reflective screen 1095. This may occur since the first reflective LCD array 1010 containing the reflective LCD pixel shutter 1020 may be programmed to be closed which may be reflective (R). Since the first reflective LCD array's 1010 reflective LCD pixel shutter 1020 may be stacked in front of the second reflective LCD array's 1090 reflective LCD pixel shutter 1065, which may block any pixel image from transferring to the second reflective LCD pixel array's 1090 reflective LCD pixel shutter 1065. Since there may be no image pixel transferred from the first reflective LCD array 1010 to the second reflective LCD array 1090 for this particular stacked pixel embodiment then the value of the reflective LCD pixel shutter 1065 may be a do not care (X). Therefore, the reflective LCD pixel shutter 1065 may be either closed which may be reflective (R) or open which may be transparent (T).

The reflective LCD pixel shutters may be programmed to be either closed, reflective (R), or open, transparent (T), in any combination so that different focal lengths for individual image pixels may be created to generate depth within the converted image. The depth addition that may be required may be dependent on the image that may be projected.

In certain embodiments, FIG. 10 depicts a side view of a row of reflective LCD pixel shutters of multiple reflective LCD arrays 1010 and 1090 within a 2D to 3D image converter. Each reflective LCD pixel shutter within a row of reflective LCD arrays 1010 and 1090 may be programmed to be either closed which may be reflective (R) 1020 or open which may be transparent (T) 1030. A pixel projected image 1075 may be projected to an open reflective LCD pixel shutter 1030 on a first reflective LCD array 1010, which may allow the pixel image 1075 to transparently transfer the pixel image through the first reflective LCD array 1010 and transmit the pixel image 1077 towards the second reflective LCD array 1090. The pixel projected image 1077 may be projected to an open reflective LCD pixel shutter 1037 on a second reflective LCD array 1090, which may allow the pixel image 1077 to transparently transfer the pixel image through the second reflective LCD array 1090 and transmit the pixel image 1079 towards the next reflective element, which may be a reflective screen 1095. The next reflective element, such as a reflective screen 1095 may reflect the incoming pixel image 1079 to the outgoing pixel image 1035 back towards the focus optics 1050 for combination within the image combiner 830. In certain embodiments, there may be more levels of stacked reflective LCD arrays to generate more focal lengths of image pixels, which may generate more depth control of an image. Therefore, it is understood that the invention is not to be limited to the specific embodiments disclosed, and that modifications and embodiments are intended to be included as readily appreciated by those skilled in the art.

Figure 11:
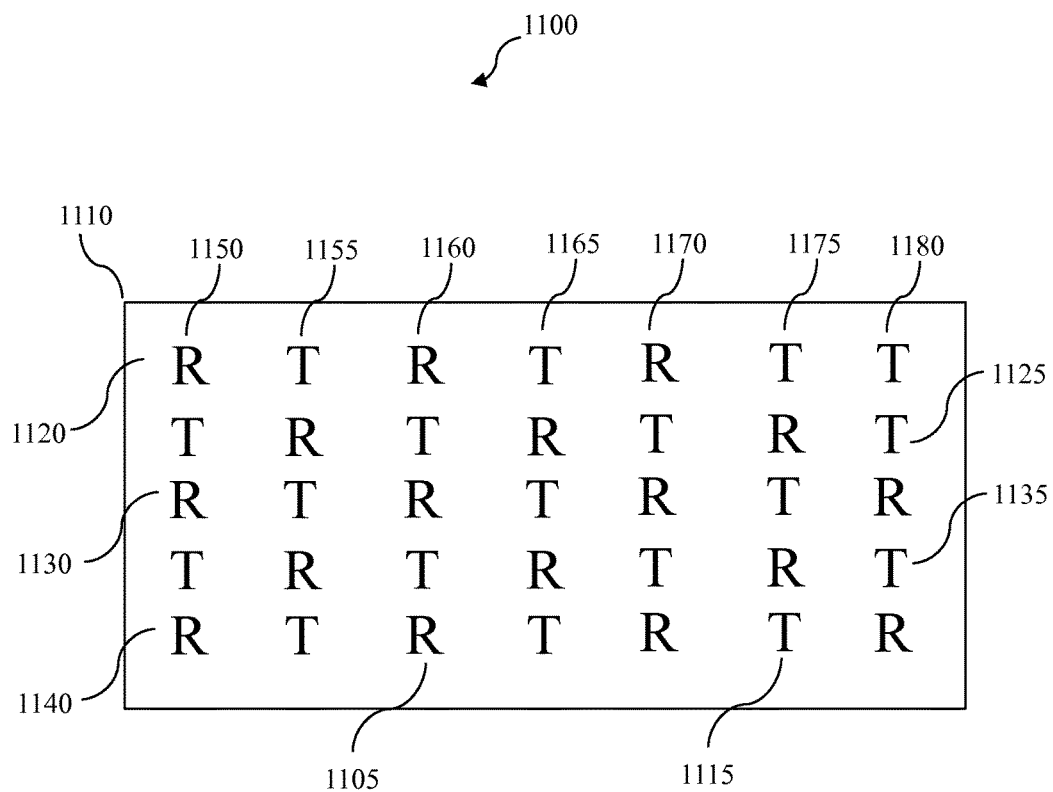
FIG. 11 depicts a top view of a reflective LCD array containing reflective LCD pixel shutters that may be programmed to be either reflective or transparent in accordance with certain embodiments.

FIG. 11 depicts a top view of a reflective LCD array 1110 containing reflective LCD pixel shutters that may be programmed to be either reflective (R) 1105 or transparent (T) 1115 in accordance with certain embodiments of the present invention. A reflective LCD array contains multiple rows 1120, 1125, 1130, 1135 and 1140 and multiple columns 1150, 1155, 1160, 1165, 1170, 1175 and 1180 of LCD pixel shutters that may be programmed individually to be either closed, which may be reflective (R) 1105, or open, which may be transparent (T) 1115. The reflective LCD array may have any number of rows and columns. Therefore, it is understood that the invention is not to be limited to the specific embodiments disclosed, and that modifications and embodiments are intended to be included as readily appreciated by those skilled in the art.

Figure 12:
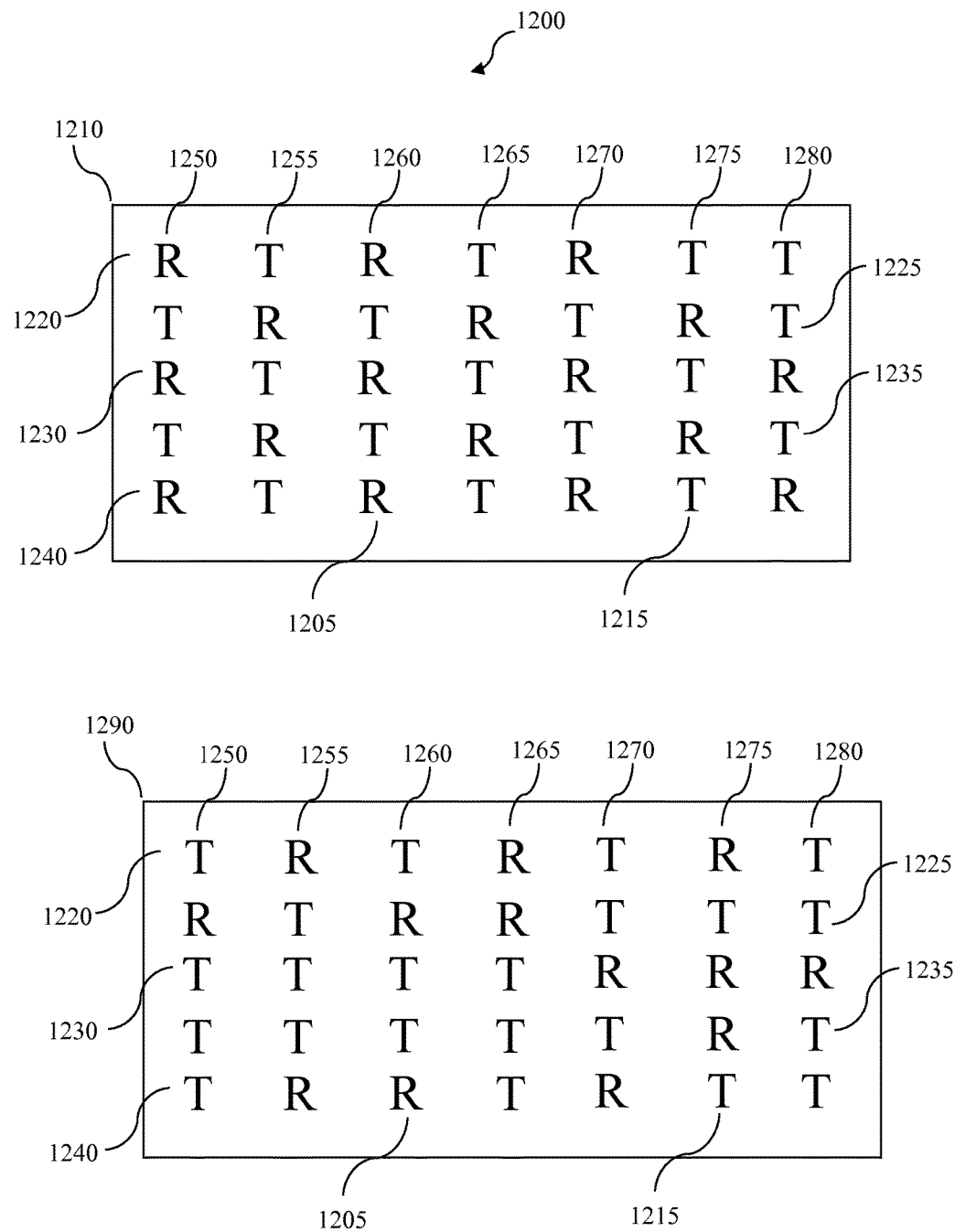
FIG. 12 depicts a top view of two reflective LCD arrays containing reflective LCD pixel shutters that may be programmed to be either reflective or transparent in accordance with certain embodiments.

In certain embodiments, FIG. 12 depicts a top view of two reflective LCD arrays 1210 and 1290 containing rows and columns of reflective LCD pixel shutters that may be independently programmed to be either reflective (R) 1205 or transparent (T) 1215. The two reflective LCD arrays 1210 and 1290 may be stacked within the 2D to 3D image converter to generate a 3D projected image. In certain embodiments, a 3D projected image may be generated by projecting a 2D projected image onto a first reflective LCD array 1210. If the reflective LCD pixel shutter 1225 is transparent (T), then the pixel image may transition through the reflective LCD array transparently towards the second reflective LCD array 1290 in the chain of stacked reflective LCD arrays to generate different length optical paths that may create a 3D image which contains depth within the projected image. The two reflective LCD arrays contain multiple rows 1220, 1225, 1230, 1235 and 1240 and multiple columns 1250, 1255, 1260, 1265, 1270, 1275 and 1280 of LCD pixel shutters that may be programmed individually to be either closed, which may be reflective (R) 1205, or open, which may be transparent (T) 1230. The reflective LCD array may have any number of rows and columns. The second reflective LCD array 1290 may have more rows and columns than the first reflective LCD array 1210. There may be any number of reflective LCD arrays stacked to generate different length optical paths that may create depth within the corrected 3D projected image. Therefore, it is understood that the invention is not to be limited to the specific embodiments disclosed, and that modifications and embodiments are intended to be included as readily appreciated by those skilled in the art.

Figure 13:
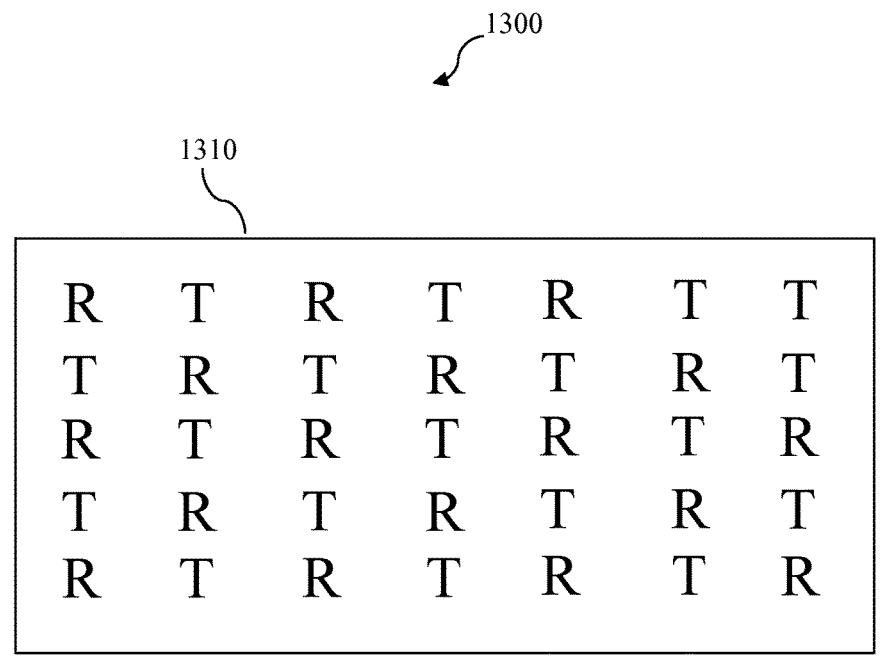
FIG. 13 depicts a top view of multiple reflective LCD arrays within one plane containing reflective LCD pixel shutters that may be programmed to be either reflective or transparent in accordance with certain embodiments.
Figure 13:
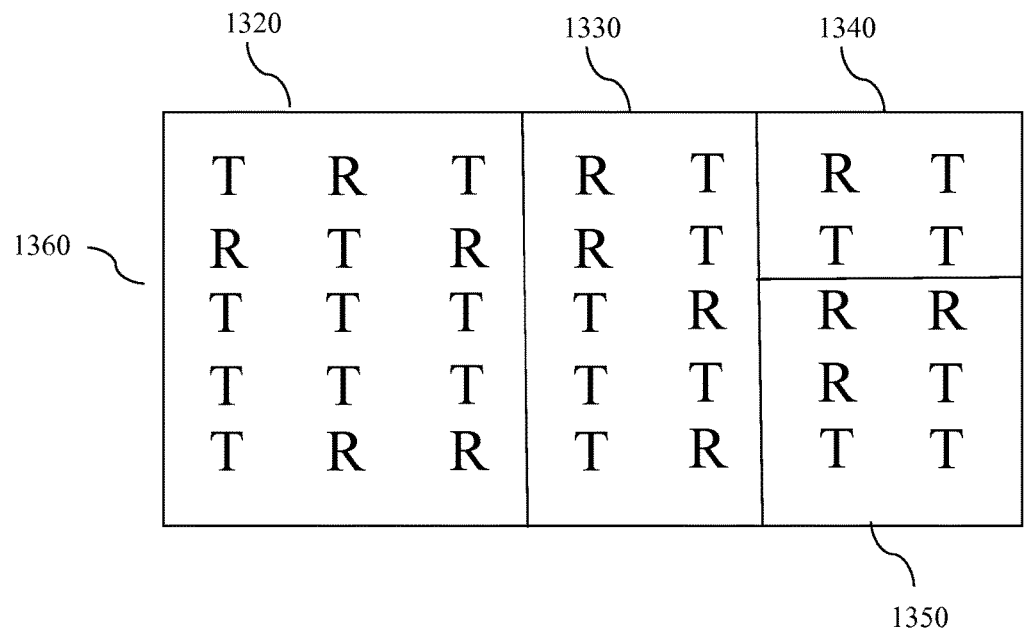

In certain embodiments, a reflective LCD array may be made from a combination of more than one reflective LCD within the same plane. In certain embodiments, FIG. 13 depicts that multiple reflective LCD arrays within the same plane may be used in combination to create a 2D to 3D conversion for the second reflective LCD array 1360 comprising of arrays 1320, 1330, 1340, and 1350 whereas one reflective LCD array 1310 may be used for the first plane. Any number of arrays may be used in combination for any plane within the 2D to 3D image converter. Each reflective LCD array 1310, 1320, 1330, 1340, and 1350 as shown in FIG. 13 may also be a different physical size and may also contain a different number of reflective LCD pixel shutter rows and columns. Therefore, it is understood that the invention is not to be limited to the specific embodiments disclosed, and that modifications and embodiments are intended to be included as readily appreciated by those skilled in the art.

Figure 14:
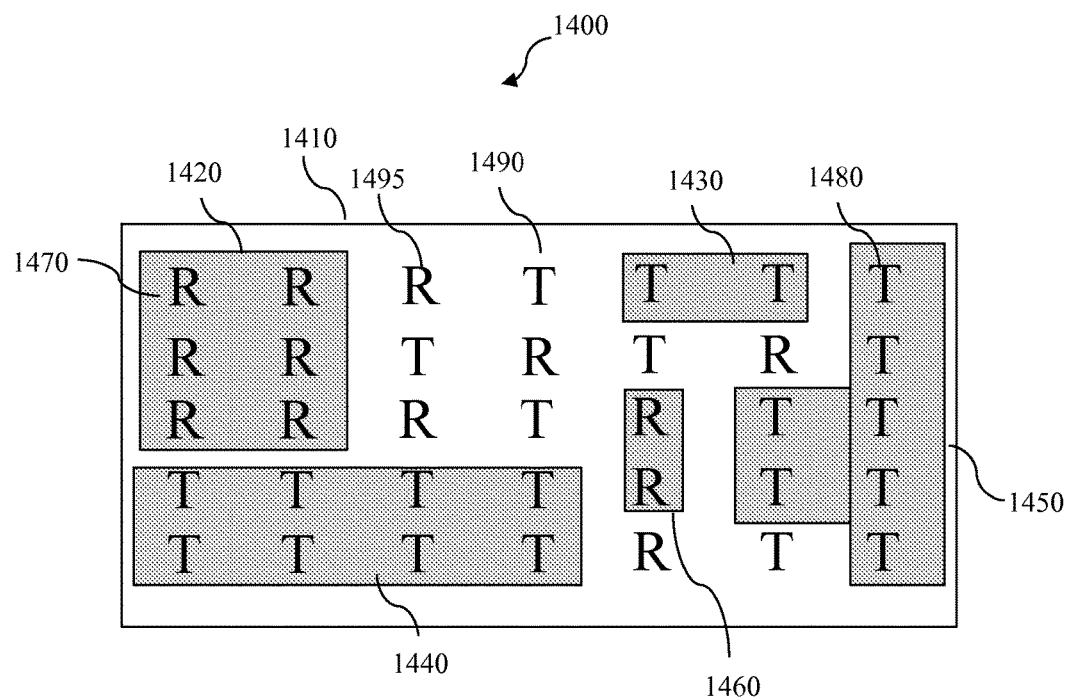
FIG. 14 depicts a top view of a reflective LCD array containing reflective LCD pixel shutters that may be programmed to be grouped together as regions within multiple groupings in accordance with certain embodiments.

In certain embodiments, FIG. 14 depicts regions 1420, 1430, 1440, 1450, and 1460 of reflective LCD pixel shutters that may be programmed to be grouped together. A region may be any grouping of two of more image pixels. A region may be a group of reflective LCD pixel shutters that may have the same reflective LCD pixel shutter position. Each reflective LCD pixel shutter position within the region may either be programmed to be closed, which may be reflective (R) 1470, or open, which may be transparent (T) 1480. This may allow the image pixels associated with a particular region to traverse the same number of reflective LCD arrays so that the focal length for all the image pixels within the region (group) may be the same. This may allow for programming and controlling the depth of each region (group) independently. There may be many different groupings within a reflective LCD array for controlling the focal length. Each of the groupings 1420, 1430, 1440, 1450, and 1460 may be a different size, may contain a different number of reflective LCD pixel shutters, and may have a different shape as depicted in FIG. 14. There may be many regions of reflective LCD pixel shutters as well as individual reflective LCD pixel shutters programmed to be closed, which may be reflective (R) 1495, or open, which may be transparent (T) 1490, for controlling the focus depth of a projected image on a pixel by pixel basis or on a region by region basis to create a 3D image, for example and without limitation for a heads-up display (HUD) for augmented reality applications. The 2D to 3D image converter may be programmed to convert individual image pixels from 2D to 3D or regions of image pixels from 2D to 3D or any combination of individual pixels and regions of image pixels. In certain embodiments, different portions of a 2D projected image may travel different paths and lengths to generate different depths of individual image pixels or regions of image pixels to generate a 3D image. Therefore, it is understood that the invention is not to be limited to the specific embodiments disclosed, and that modifications and embodiments are intended to be included as readily appreciated by those skilled in the art.

Figure 15:
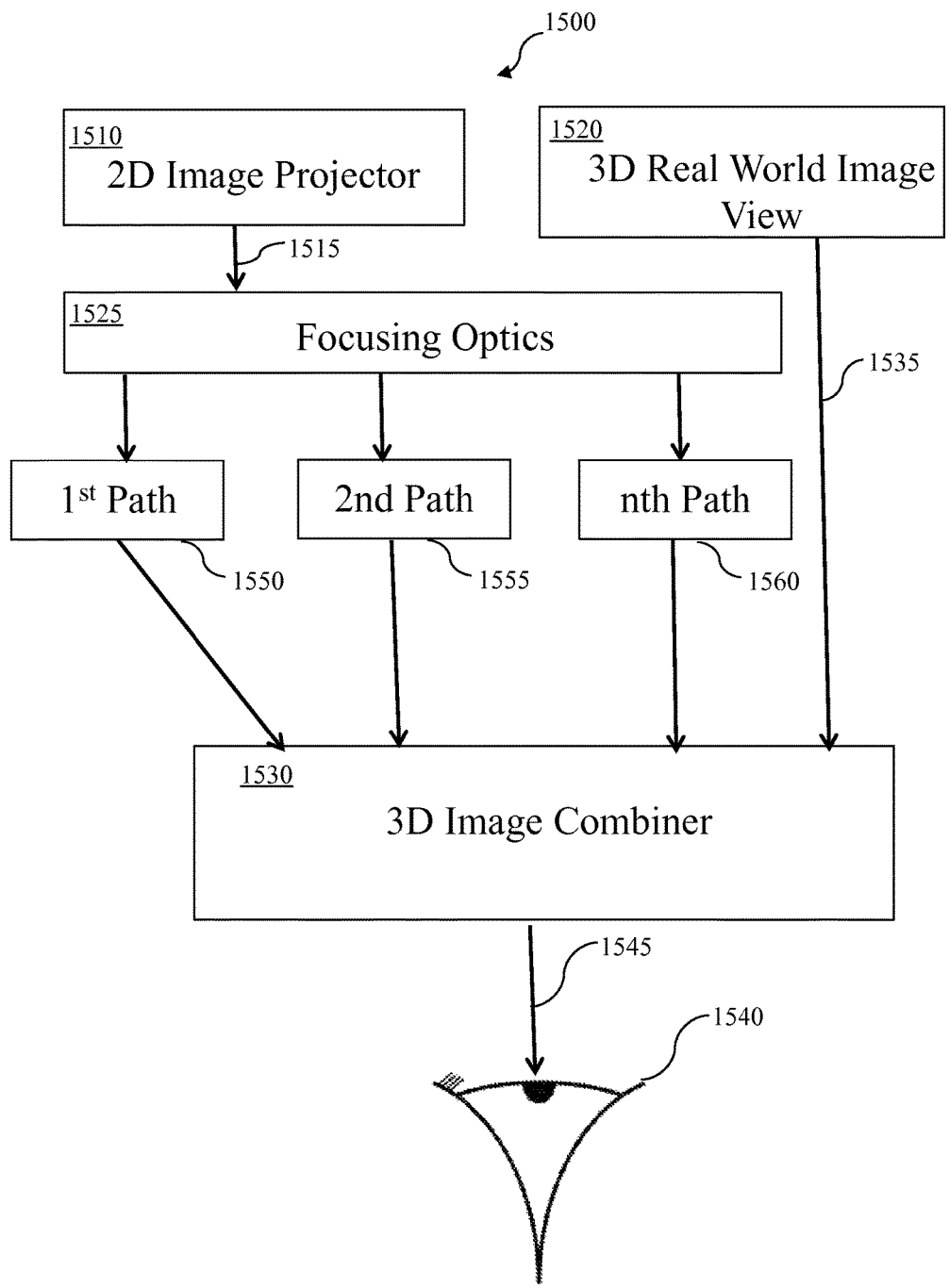
FIG. 15 depicts a 2D to 3D image converter for varying the optical path of the 2D image projection and combining with the 3D real world image view prior to the image being presented to the eye within a heads-up display (HUD) for augmented reality applications in accordance with certain embodiments.

In certain embodiments as shown in FIG. 15 a 2D image projector 1510 may project a 2D image 1515 to focusing optics 1525 which may be part of a 2D to 3D image converter. Focusing optics 1525 may focus image pixels from the 2D image projector through different multiple optical paths, a $1^{st}$ optical path 1550, a second optical path 1555, through a nth optical path 1560, where the nth optical path 1560 may be the last optical path. The $1^{st}$ optical path 1550 may be the shortest optical path, the $2^{nd}$ optical path 1555 may be the next longest optical path, and so on until the longest optical path, the nth optical path 1560. There may be any number of different optical length paths. The optical length paths may travel different lengths to generate different depths of individual image pixels or regions of image pixels. A region may be any grouping of two or more individual image pixels within the image. In certain embodiments, the longer the optical path 1560 the further away an image may appear when displayed. In certain embodiments, the shorter the optical path 1550 the closer an image may appear when displayed. The 3D image combiner may combine all of the converted 2D projected image paths 1550, 1555 . . . 1560 with the 3D real world image view 1535 and present the combined image 1545 to the eye 1540. In certain embodiments, the 3D image combiner 1530 may overlay a 3D projected image view from the multiple paths 1550, 1555 . . . 1560, with a 3D real world image view 1535 creating a combined 3D image 1545 for a heads-up display (HUD) for augmented reality applications.

Figure 16:
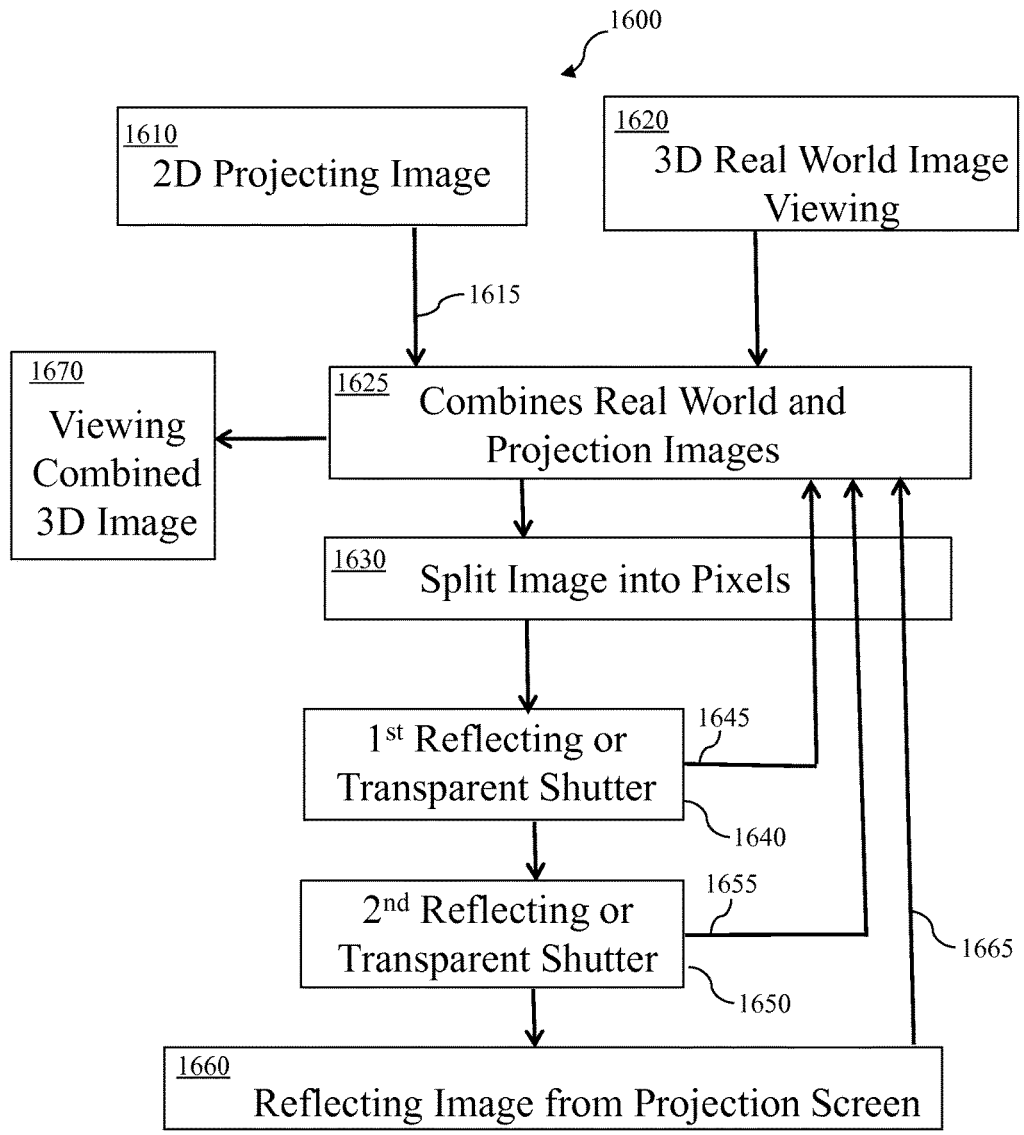
FIG. 16 depicts a flow chart of an embodiment of the method using a 2D to 3D image converter in combining multiple images to from a composite 3D image within a heads-up display (HUD) for augmented reality applications in accordance with certain embodiments.

In certain embodiments, the flow chart of FIG. 16 depicts a method using an image combiner with a 2D to 3D image converter that may combine a 3D real world image view with a 2D projected image that may be converted from 2D to 3D prior to being combined. The 2D projection image 1610 may enter the combining optical component 1625 that may combine a real world image with a projected image and be transmitted to the image pixel focusing optics 1630 where the 2D projected image may be split into individual image pixels and directed to the $1^{st}$ reflecting or transparent image LCD pixel shutter 1640. If the LCD pixel shutter for a particular region or a particular pixel is programmed to be reflective then that particular part of the image may be sent back along the path 1645 to the image combiner 1625 for combination with the 3D real world image 1620. If the $1^{st}$ reflecting or transparent image LCD pixel shutter 1640 is programmed to be transparent for a particular region or a particular pixel then the particular region or particular pixel may be sent to the $2^{nd}$ reflecting or transparent image LCD pixel shutter 1650. If the LCD pixel shutter for the $2^{nd}$ reflecting or transparent image LCD pixel shutter 1650 for a particular region or a particular pixel is programmed to be reflective then that image may be sent back along the path 1655 to the image combiner 1625 for combination with the 3D real world image 1620. If the $2^{nd}$ reflecting or transparent image LCD pixel shutter 1650 is programmed to be transparent for a particular region or a particular pixel then that the particular region or particular pixel may be sent to the reflecting projection screen 1660 where a particular region or a particular pixel may be sent back along the path 1665 to the image combiner 1625. There may be more than two reflecting or transparent shutter arrays to create more focal lengths. Therefore, it is understood that the invention is not to be limited to the specific embodiments disclosed, and that modifications and embodiments are intended to be included as readily appreciated by those skilled in the art.

Figure 17:
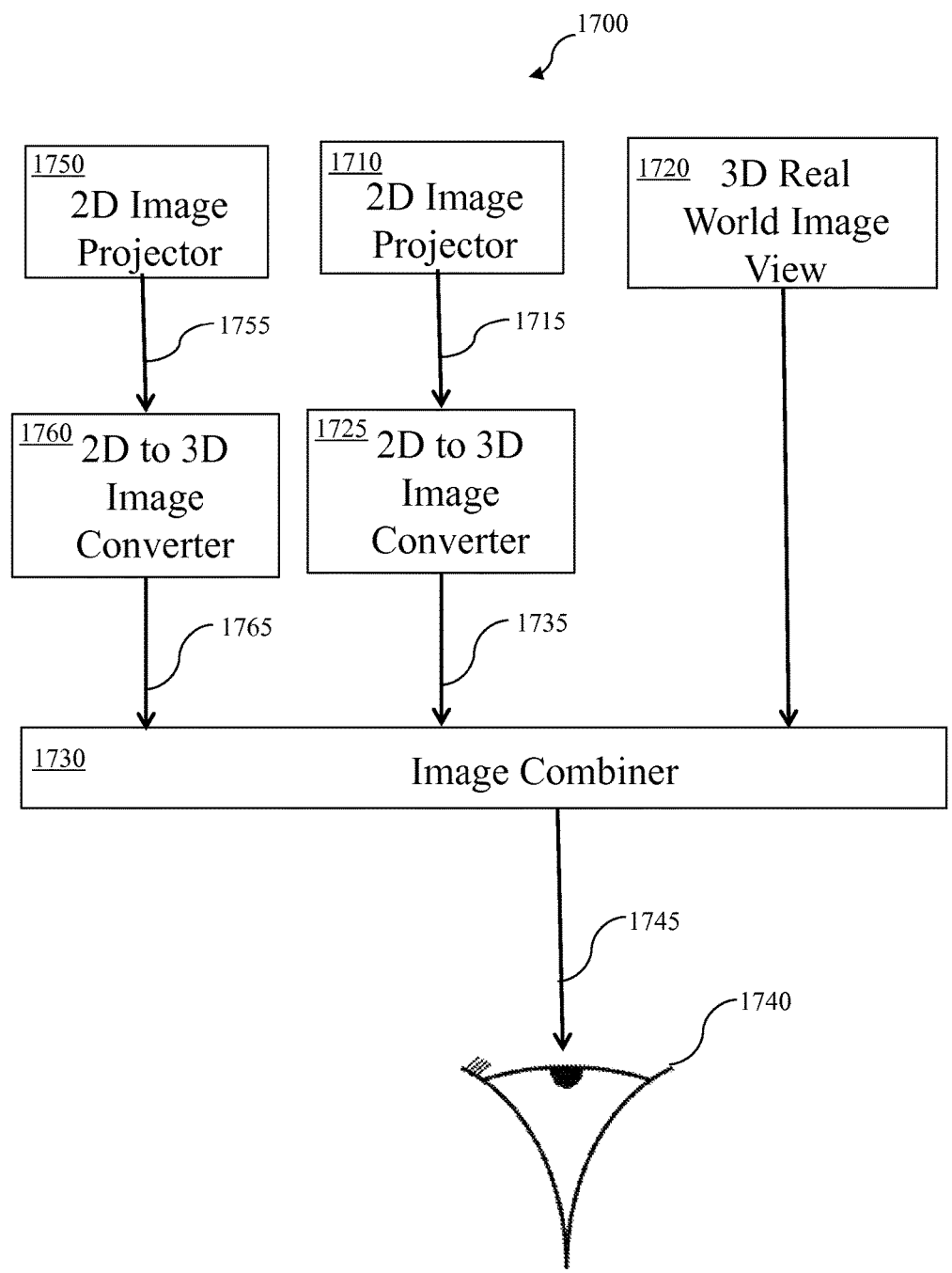
FIG. 17 depicts two 2D projected images converted to 3D projected images combined with a 3D real world image view and presented to the eye within a heads-up display (HUD) for augmented reality applications in accordance with certain embodiments.

In certain embodiments, FIG. 17 depicts two separate 2D projectors 1750 and 1710 along with two 2D to 3D image converters 1760 and 1725. FIG. 17 depicts a first 2D image projector 1710 that may project a 2D image 1715 to a first 2D to 3D image converter 1725. The first 2D to 3D image converter 1725 may take a first 2D projected image 1715 as an input and output a first 3D projected image 1735. A second 2D image projector 1750 may project a 2D image 1755 to a second 2D to 3D image converter 1760. The second 2D to 3D image converter 1760 may take a second 2D projected image 1755 as an input and output a second 3D projected image 1765. The 3D projected images 1735 and 1765 may be combined with a 3D real world image view 1720 using an image combiner 1730. In certain embodiments, the image combiner 1730 may overlay or combine the first 3D projected image view 1735 and the second 3D projected image view 1765 with the 3D real world image view 1720 to create a combined 3D image 1745 for a heads-up display (HUD) for augmented reality applications. Any number of 2D image projectors with one or more 2D to 3D image converters may be encompassed within the invention. Therefore, it is understood that the invention is not to be limited to the specific embodiments disclosed, and that modifications and embodiments are intended to be included as readily appreciated by those skilled in the art.

While the above description contains many specifics and certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art, as mentioned above. The invention includes any combination or subcombination of the elements from the different species and/or embodiments disclosed herein.

I claim:

1. An image combiner system, comprising:
   a 2D image projector;
   a 2D to 3D image converter that receives a 2D projected image from the 2D image projector and converts the 2D projected image to a 3D projected image; and
   an image combiner that receives the 3D projected image from the 2D to 3D image converter and combines the 3D projected image with a 3D real world image;
   wherein the 2D to 3D image converter comprises a reflective LCD pixel array and a reflective screen, the reflective LCD pixel array positioned in front of the reflective screen relative to the 2D image projector to initially receive the 2D projected image from the 2D image projector,
   and the reflective LCD pixel array comprises a plurality of LCD pixel shutters, each of the LCD pixel shutters is programmable to either a closed position where the LCD pixel shutter is reflective and reflects a portion of the 2D projected image toward the image combiner, or an open position where the LCD pixel shutter is transparent and passes a portion of the 2D projected image toward the reflective screen to be reflected thereby toward the image combiner, such that portions of the 2D projected image reflected by the LCD pixel shutters have a shorter optical path length than portions of the 2D projected image reflected by the reflective screen to convert the 2D projected image into the 3D projected image provided to the image combiner.

2. The image combiner system of claim 1, wherein the reflective LCD pixel array is a first reflective LCD pixel array, and the 2D to 3D image converter comprises:
   a second reflective LCD pixel array positioned in front of the first reflective LCD pixel array, the second reflective LCD pixel array comprising a plurality of LCD pixel shutters, each of the LCD pixel shutters is programmable to either a closed position where the LCD pixel shutter is reflective and reflects a portion of the 2D projected image toward the image combiner, or an open position where the LCD pixel shutter is transparent and passes a portion of the 2D projected image toward the first reflective LCD pixel array.

3. The image combiner system of claim 1, wherein the reflective LCD pixel array comprises M rows and N columns of LCD pixel shutters.

4. The image combiner system of claim 2, wherein the 2D to 3D image converter comprises:
   a third reflective LCD pixel array positioned in front of the second reflective LCD pixel array, the third reflective LCD pixel array comprising a plurality of LCD pixel shutters, each of the LCD pixel shutters is programmable to either a closed position where the LCD pixel shutter is reflective and reflects a portion of the 2D projected image toward the image combiner, or an open position where the LCD pixel shutter is transparent and passes a portion of the 2D projected image toward the second reflective LCD pixel array.

5. The image combiner system of claim 1, wherein each of the plurality of LCD pixel shutters is programmable to reflect at least one group of pixels from the 2D projected image.

6. The image combiner system of claim 1, wherein each of the plurality of LCD pixel shutters is programmable to permit at least one pixel from the 2D projected image to pass transparently through the reflective LCD pixel array.

7. The image combiner system of claim 1, wherein each of the plurality of LCD pixel shutters is programmable to permit at least one group of pixels from the 2D projected image to pass transparently through the reflective LCD pixel array.

8. The image combiner system of claim 1, wherein the image combiner comprises two triangularly shaped prisms coupled together.

9. The image combiner system of claim 1, wherein the 2D to 3D image converter includes a focus optics element positioned in front of the reflective LCD pixel array.

10. The image combiner system of claim 1, wherein each LCD pixel shutter of the plurality of LCD pixel shutters selectively reflects or passes a single pixel of the 2D projected image.

11. The image combiner system of claim 1, wherein each LCD pixel shutter of the plurality of LCD pixel shutters selectively reflects or passes a group of pixels of the 2D projected image.

12. A method of combining images, comprising:
    projecting a 2D image;
    converting the 2D image to a 3D projected image; and
    combining, via an image combiner, the 3D projected image with a 3D real world image;
    wherein the converting is performed at least in part by a reflective LCD pixel array and a reflective screen, the reflective LCD pixel array positioned in front of the reflective screen and comprises a plurality of LCD pixel shutters, each of the LCD pixel shutters is programmable to either a closed position where the LCD pixel shutter is reflective and reflects a portion of the 2D projected image toward the image combiner, or an open position where the LCD pixel shutter is transparent and passes a portion of the 2D projected image toward the reflective screen to be reflected thereby toward the image combiner, such that portions of the 2D projected image reflected by the LCD pixel shutters have a shorter optical path length than portions of the 2D projected image reflected by the reflective screen to convert the 2D projected image into the 3D projected image provided to the image combiner.

13. The method of claim 12, wherein the reflective LCD pixel array comprises a first reflective LCD pixel array, and the converting is performed at least in part by:
    a second reflective LCD pixel array positioned in front of the first reflective LCD pixel array, the second reflective LCD pixel array comprising a plurality of LCD pixel shutters, each of the LCD pixel shutters is programmable to either a closed position where the LCD pixel shutter is reflective and reflects a portion of the 2D projected image toward the image combiner, or an open position where the LCD pixel shutter is transparent and passes a portion of the 2D projected image toward the first reflective LCD pixel array.

14. The method of claim 13, wherein the converting is performed at least in part by:
    a third reflective LCD pixel array positioned in front of the second reflective LCD pixel array, the third reflective LCD pixel array comprising a plurality of LCD pixel shutters, each of the LCD pixel shutters is programmable to either a closed position where the LCD pixel shutter is reflective and reflects a portion of the 2D projected image toward the image combiner, or an open position where the LCD pixel shutter is transparent and passes a portion of the 2D projected image toward the second reflective LCD pixel array.

15. The method of claim 12, wherein the plurality of LCD pixel shutters comprises M rows and N columns of LCD pixel shutters.

16. The method of claim 12, wherein the converting programming at least one of the plurality of LCD pixel shutters to reflect at least one pixel from the 2D image away from the reflective LCD pixel array.

17. The method of claim 12, wherein the converting programming at least one of the plurality of LCD pixel shutters to reflect at least one group of pixels from the 2D image away from the reflective LCD pixel array.

18. The method of claim 12, wherein the converting programming at least one of the plurality of LCD pixel shutters to permit at least one pixel from the 2D image to pass transparently through the reflective LCD pixel array.

\* \* \* \* \*